(12) United States Patent  (10) Patent No.: US 8,393,806 B2
Lai  (45) Date of Patent: Mar. 12, 2013

(54) PHOTO ARM SYSTEM (75) Inventor: Peng-Cheng Lai, Los Altos, CA (US)

(73) Assignee: Ortery Technologies, Inc., Irvine, CA (US)

( * ) Notice: Subject to any disclaimer, the term of this patent is extended or adjusted under 35 U.S.C. 154(b) by 318 days.

(21) Appl. No.: 12/787,710

(22) Filed: May 26, 2010

(65) Prior Publication Data
US 2011/0293262 A1 Dec. 1, 2011

(51) Int. Cl.
*G03B 17/00* (2006.01)
*H04N 5/225* (2006.01)

(52) U.S. Cl. ........ 396/428; 396/422; 396/424; 348/375; 352/243

(58) Field of Classification Search ................. 396/428, 396/419, 422, 424; 348/373, 375, 722; 352/243
See application file for complete search history.

(56) References Cited

U.S. PATENT DOCUMENTS

| | | | | |
|---|---|---|---|---|
| 2,211,088 | A | * | 8/1940 | Arnold ........................ 396/428 |
| 2011/0129210 | A1 | * | 6/2011 | McGucken .................. 396/422 |

* cited by examiner

*Primary Examiner* — Rochelle-Ann J Blackman (57) ABSTRACT

A photo arm is proposed here. A revolving handwheel is equipped for driving a transmission mechanism to bring the photo arm to rotate, so that a camera fixed on the photo arm can shoot from different angles along a circular path. The photo arm is also equipped with a power and signal connecting box for supplying power to the camera and transmitting image information and control instructions. Furthermore, a hoist handwheel is equipped for adjusting the height of the rotation center of the photo arm.

15 Claims, 7 Drawing Sheets

PHOTO ARM SYSTEM

FIELD OF THE INVENTION

The present invention relates to a photo arm system, which is manually operated to rotate along a circular path with a given radius, shooting radius. A camera can be fixed on the photo arm system to shoot from different angles along the circular path. The photo arm system is equipped with a power and signal connecting box for supplying power to the camera and transmitting image signals and control instructions. Further, a height adjuster is applied to adjust the height of the rotation center of the photo arm.

DESCRIPTION OF THE RELATED ART

For a manual photo arm system, the shooting angle of the camera is fixed on one end of the photo arm and a counterweight is arranged on the other end for balance. The shooting angle of the camera is adjusted by hand, not yet found a transmission mechanism is applied. The general automatic photo arm systems are not driven by worms/worm gears but by servomotors.

Regardless of a manual photo arm system or an automatic photo arm system, no power and signal connecting box is equipped with, the shooting radius and the height of the rotation center are not adjustable.

The cable length of a camera power adapter normally is not long enough to reach the power outlet. If no power and signal connecting box is set on the photo arm system or the camera fixing compartment, the computer cannot control the camera through the power cord or USB cable, and the problems of esthetics and imperfect contact will be raised up.

The shooting radius should be adjusted according to the size of the object to attain a better photo effect. However, the photo device is normally confined to a circular track with a fixed radius. It is very inconvenient that the circular track must be changed for different objects.

The rotation center is not adjustable if no hoist mechanism. Therefore, a turntable platform and the rotation center can't be set at the same height levels to cause an image shifting when taking 3D photos.

SUMMARY OF THE INVENTION

In one aspect, handwheels, straight bevel gears, worms, worm gears are applied in the photo arm system of the present invention to swing a vertical arm and a horizontal arm for driving a camera, installed on the horizontal arm, for shooting an object from different angles along a circular path.

In one aspect, a power and signal connecting box is arranged on a photo arm or a camera fixing compartment thereof a computer can control the camera via the power and signal connecting box.

In one aspect, a hoist mechanism is applied in the photo arm system of the present invention for adjusting the height of the rotation center of the photo arm.

In one aspect, the photo arm system of the present invention comprises a horizontal arm set and a vertical arm set, wherein the horizontal arm set is, through at least a slide, fastened on the vertical arm set to be capable of adjusting the shooting radius.

In one embodiment, the photo arm system of the present invention comprises several vertical arms, such as a left vertical arm and a right vertical arm, to enhance the firmness of the photo arm system.

In one embodiment, the photo arm system of the present invention comprises a front swing plate, connected to the vertical arm set, and a rear swing plate for counterbalancing the rotation momentum to reduce weariness on the rotation center.

In one embodiment, a lot of clamp levers are used in the photo arm system of the present invention to simplify the installation and adjustment of the photo arm system.

Below, the embodiments are described in detail in cooperation with the attached drawings to make easily understood the characteristics and advantages of the present invention.

DETAILED DESCRIPTION OF THE INVENTION

Below, the embodiments of the present invention are described in detail in cooperation with the drawings to further demonstrate the objectives, characteristics and functions of the present invention.

Figure 1:
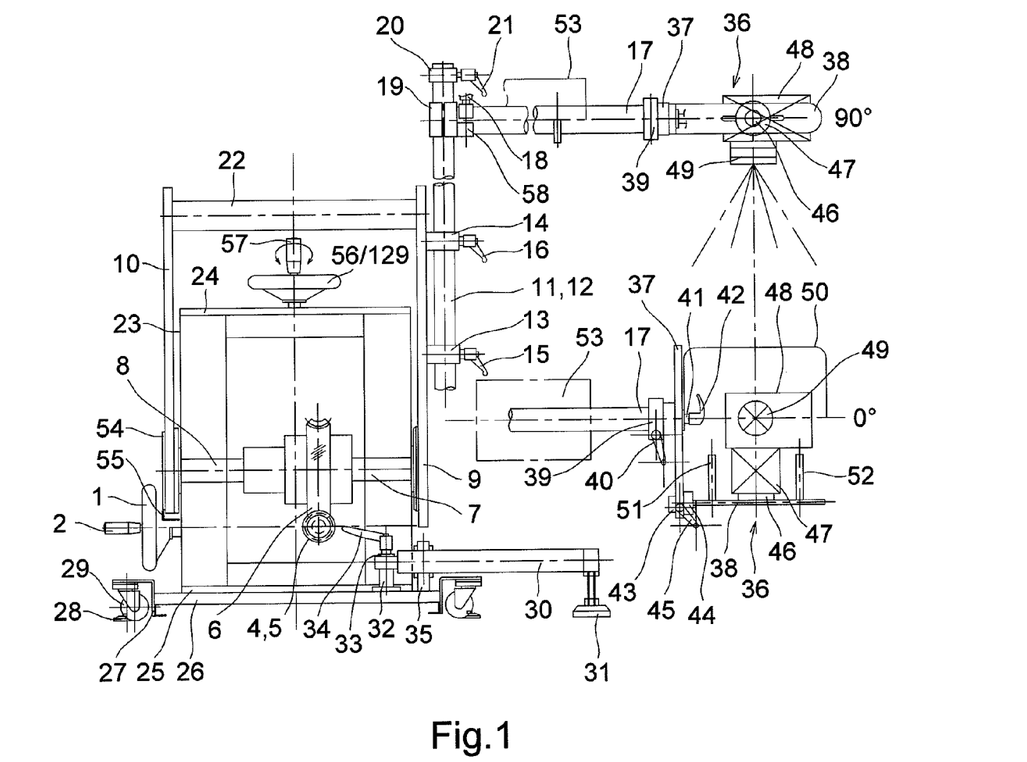
FIG. 1 is a front view of a photo arm system according to one embodiment of the present invention.

Refer to FIG. 1 a front view of a photo arm system according to one embodiment of the present invention. The user can spin a handwheel 1 to drive a transmission mechanism to swing a vertical arm and a horizontal arm. A revolving grip 2 is set up on the handwheel 1 for operation of convenience.

Figure 4:
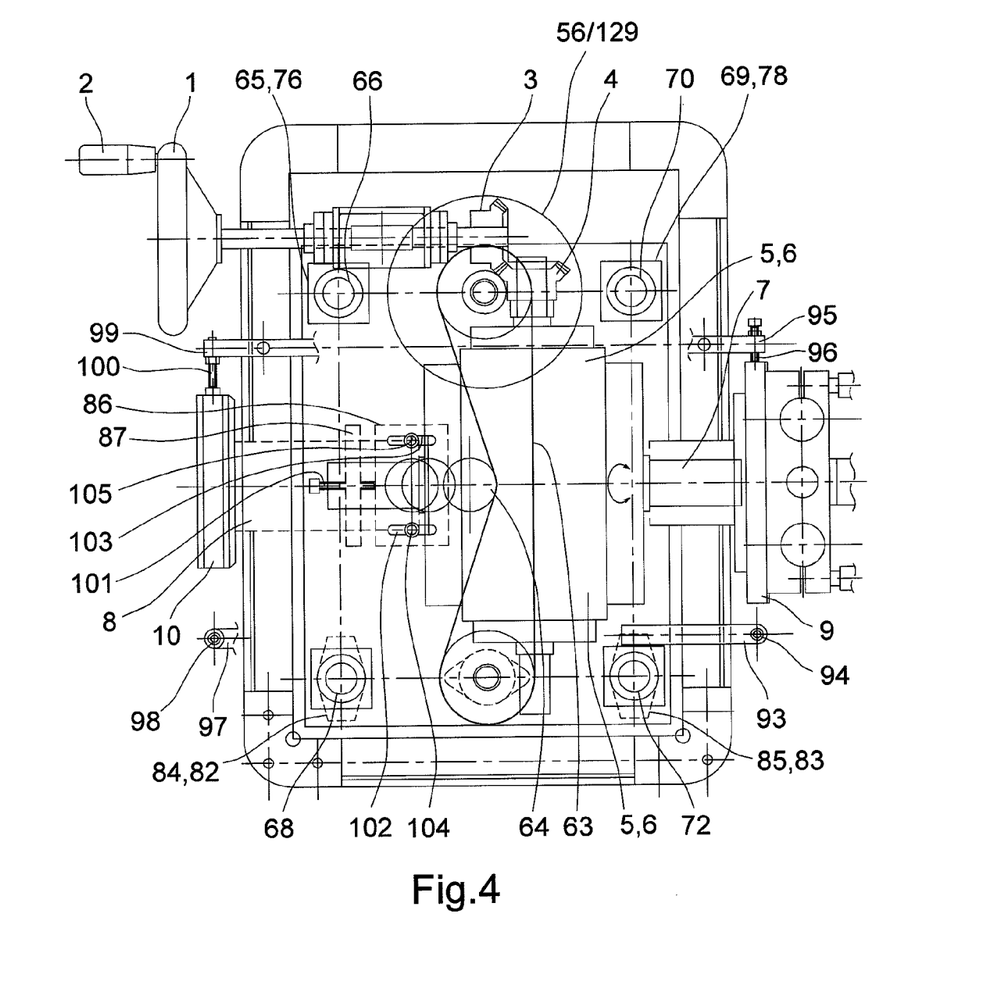
FIG. 4 is a top view schematically showing the detailed structure of a photo arm system according to one embodiment of the present invention.

In this embodiment, the handwheel 1 drives a straight bevel gear 3, a straight bevel gear 4, a worm 5, a worm gear 6, a driving shaft 7 and a synchronizing shaft 8 (shown in FIG. 4). The driving shaft 7 is connected with ends of vertical arms 11 and 12, and a horizontal arm 17 is fixed on the other ends, opposite side to the driving shaft 7 of the vertical arms 11 and 12. The driving shaft 7 drives the vertical arms 11, 12 and the horizontal arm 17 to swing by an angle in between 0-90 degrees. A camera fixing compartment 36 is arranged on one end of the horizontal arm 17 for carrying a camera, so the camera can shoot an object from different angles along a circular path with a radius (shooting radius). In FIG. 1, 0° denotes a horizontal shooting position (side shooting), and 90° denotes a vertical shooting position (top-down shooting). The straight bevel gears of the transmission mechanism are only used to change the photo arm swing direction and can be omitted. The number of the vertical arms 11, 12 or the horizontal arm 17 is not limited, can be singular or plural, moreover the horizontal arm 17 can have branches (detailed in FIG. 9).

In one embodiment, a front swing plate 9 and a rear swing plate 10 are respectively arranged on the driving shaft 7 and the synchronizing shaft 8 and connected by a connecting rod 22. The vertical arms 11 and 12 are connected to the front swing plate 9. The front and rear swing plates 9 and 10 can counterbalance the rotation momentum each other to reduce weariness on the rotation center. The synchronizing shaft 8 and the rear swing plate 10 can be omitted if the weariness on the rotation center can be negligible, and the vertical arms 11 and 12 are driven by the driving shaft 7 and the front swing plate 9, or even driven by shaft 7 only.

The front swing plate 9 uses lower arm clamps 13 and upper arm clamps 14 to clamp the lower and upper portions of the left and right vertical arms 11 and 12. The numbers of the lower arm clamps 13 and upper arm clamps 14 are not limited, and each can be single or plural. Clamp levers 15 and 16 are used for convenience of installation/un-installation of the left and right vertical arms 11 and 12.

A slide block or a fixing block is used to fix the horizontal arm 17 and the vertical arm. In one embodiment, a slide block 19 is used to couple the horizontal arm 17 to the left and right vertical arms 11 and 12 via a clamp lever 18 and a fixing block 58. The slide block 19 can move vertically along the left and right vertical arms 11 and 12 to change the shooting radius. In another embodiment, a fixing block is used to couple the horizontal arm 17 to the vertical arm and the shooting radius is not adjustable.

The left and right vertical arms 11, 12 and the horizontal arm 17 swing in between 0-90 degrees along a circular path to get a possibility of falling. Ending plates 20 are arranged at the ends of the left and right vertical arms 11 and 12 and fastened by clamp levers 21 to prevent the horizontal arm 17 from falling.

The transmission mechanism is arranged inside a transmission casing 23, which has a top plate 24 and a bottom plate 25 and is installed on a chassis 26. Fixing frames 27 with fixing adjusters 28 and casters 29 are arranged at the corners of the transmission casing 23 to have the convenience of moving. For stability of the system, extended pipes 30 and adjusters 31 are used. The extended pipe 30 passed through a pipe holder 35 and is fastened, through a washer 33, on a support shaft 32 by a clamp lever 34.

The camera fixing compartment 36 is installed on the end of the horizontal arm 17 for carrying a camera 48. The camera fixing compartment 36 comprises fixing plates 37 and 38, which are, through collars 43 and 44, clamped each other by clamp levers 45. The camera fixing compartment 36 is, through a collar 39, coupled to the horizontal arm 17 and fastened by a clamp lever 40 to be capable of rotating around the horizontal arm 17. The clamp lever 42 through a washer 41 is used to tighten the camera fixing compartment 36 or loosing for moving along a slot in the fixing plate 37.

A camera fixing unit 47 is fixed on the fixing plate 38 via an adapter 46 for mounting the camera 48. Support ribs 51 and 52 are fixed on the fixing plate 38 to hold a holding tray 50 on the bottom of the camera fixing compartment 36 for preventing the camera 48 possibly from falling at shooting angle 90 degree.

A power and signal connecting box 53 may be installed on the horizontal arm 17, the left or right vertical arm 11 or 12, or the camera fixing compartment 36 for supplying power to the camera 48 and transmitting image signals or control instructions, such as the USB transmission protocol in this embodiment. This kind configuration of the power and signal connecting box 53 greatly reduce the length requirement of the power cord of the camera 48 and improve convenience of operation and esthetics of the photo arm system.

In one embodiment, a pointer 55 is arranged on the transmission casing 23 and a scale 54 on the rear swing plate 54. When swinging, the scale 54 is also rotated, and the pointer 55 can indicate the swing angle, the tilt angle of the photo arm.

Figure 2:
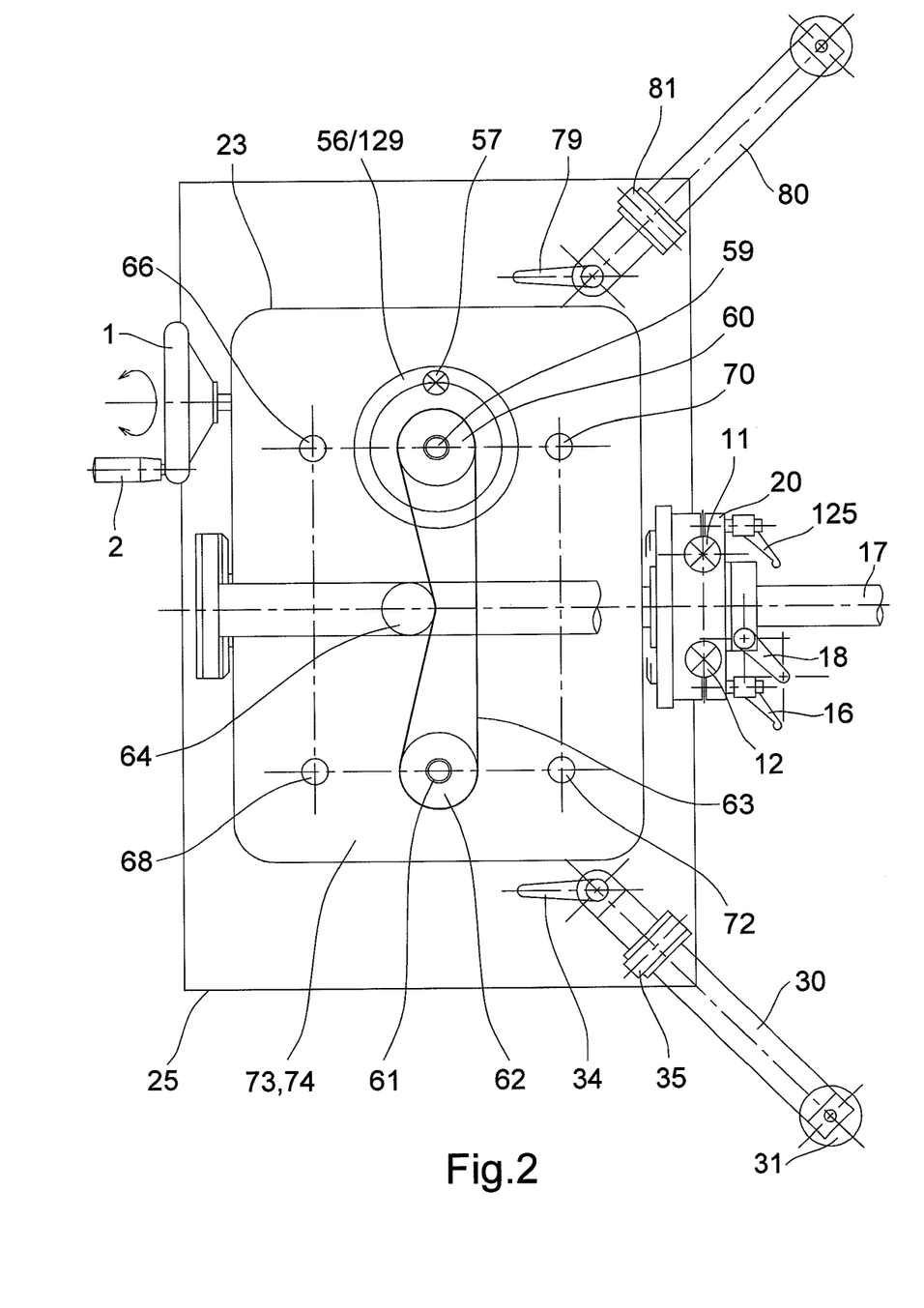
FIG. 2 is a top view of a photo arm system according to one embodiment of the present invention.
Figure 5:
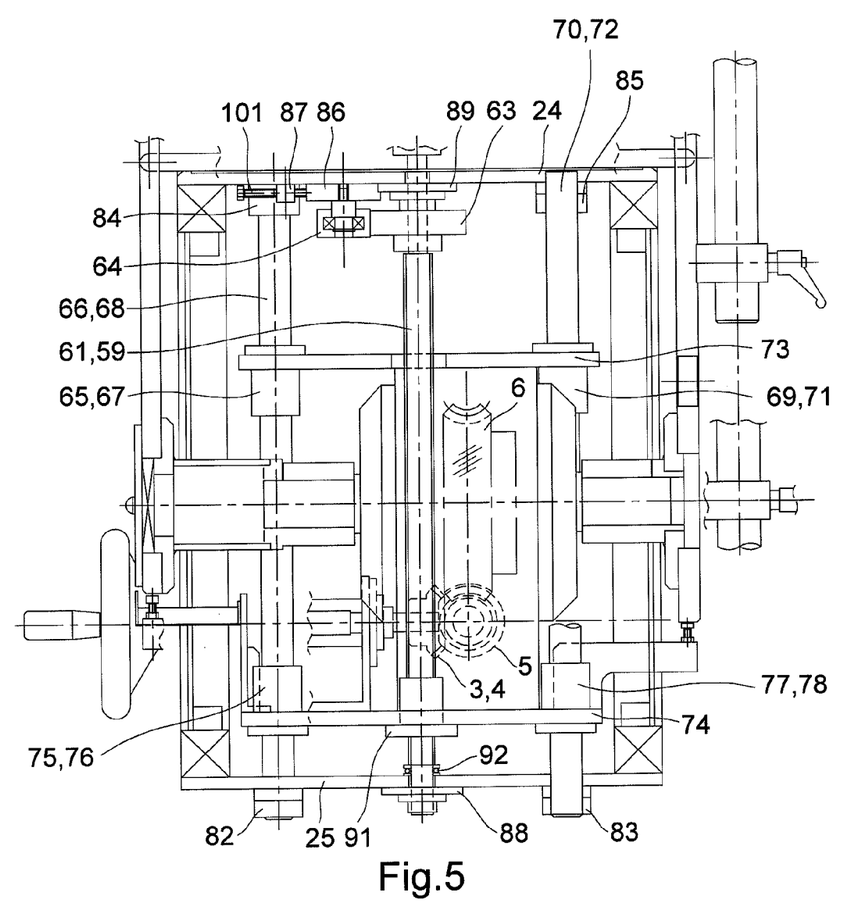
FIG. 5 is a front view schematically showing the detailed structure of a photo arm system according to one embodiment of the present invention.

A hoist handwheel 56 is installed on the top of the transmission casing 23 and coupled to a hoist mechanism, whose detail is shown in FIG. 2, FIG. 4 and FIG. 5. The spin of the hoist handwheel 56 drive the hoist mechanism up or down for adjusting the height of the rotation center of the driving shaft 7. In one embodiment, a revolving grip 57 is arranged on the hoist handwheel 56 for convenience. In one embodiment, a motor 126 is used instead of the hoist handwheel 56 and the revolving grip 57 to directly drive the hoist mechanism for the adjustments of the height of the rotation center of the driving shaft 7. That makes the rotation center can be at the same height level as the turntable platform for preventing image shifting during 3D photos creation.

FIG. 2 is a top view of a photo arm system according to one embodiment of the present invention. Timing pulleys 60 and 62 are respectively installed on slide screws 59 and 61. A timing belt 63 runs over the timing pulleys 60 and 62, and the timing pulleys 60 and 62 can be rotated synchronously.

A flange idler 64 can move back and forth to regulate the tension of the timing belt 63, detail in FIG. 4 and FIG. 5.

The hoist handwheel 56/motor 126 is fixed to the slide screw 59, and the slide screws 59 and 61 are inserted into a top sliding plate 73 and a bottom sliding plate 74 of a sliding plate assembly, which is used to fix the photo arm. Ball splines 66, 68, 70, and 72 are respectively installed on four corners of the top sliding plate 73 and the bottom sliding plate 74 to enhance the stability of the movements.

The rotation of the slide screw 59 is driven by the revolving grip 57 of the hoist handwheel 56/the motor 129 to rotate the timing pulley 60 and the timing belt 63 drives the timing pulley 62 to rotate the slide screw 61 synchronously. The rotation of slide screws 59 and 61 will drive the top and bottom sliding plates 73 and 74 up and/or down. As a result, the height of the rotation center of the photo arm can be adjusted.

Figure 3:
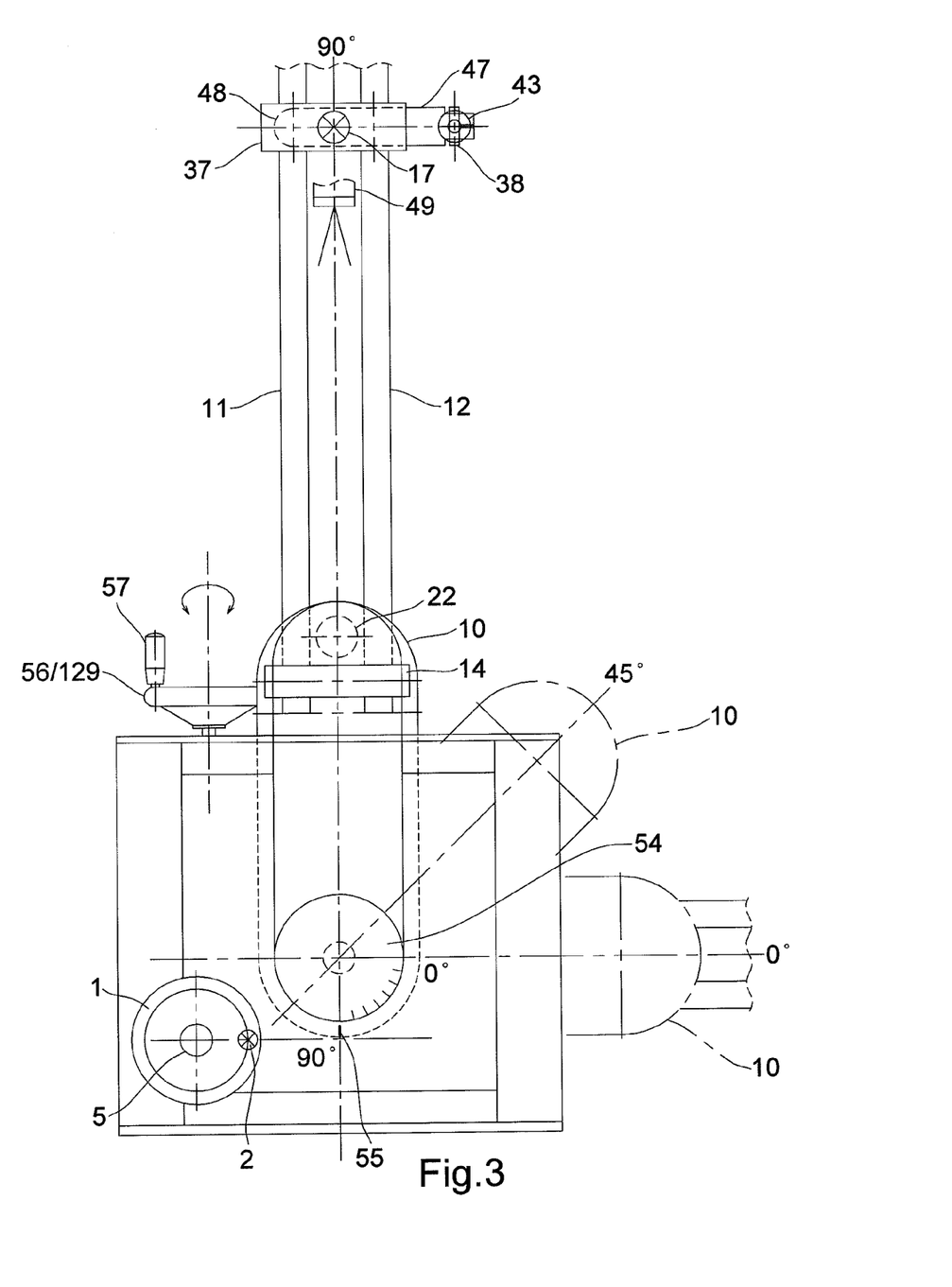
FIG. 3 is a left side view of a photo arm system according to one embodiment of the present invention.

FIG. 3 shows a left side view of a photo arm system according to one embodiment of the present invention. When spinning the revolving grip 2 of the handwheel 1, the photo arm is swung and the scale 54 is also, so the pointer 55, fixed on the transmission casing 23, can indicate the tilt angle of the photo arm.

FIG. 4 is a top view schematically showing the detailed structure of a photo arm system according to one embodiment of the present invention. When manually spinning the revolving grip 2 of the handwheel 1, the rotation drives the straight bevel gear 3 and 4, then the worm 5, then the worm gear 6 and then the driving shaft 7 to rotate. The rotation of the driving shaft 7 swings the front swing plate 9 and the photo arm. A stopper 93, a screw 94, a stopper 95 and a screw 96 are used to limit swing of the front swing plate 9 in a specified range, 0-90 degree in this embodiment. Alternatively, a stopper 97, a screw 98, a stopper 99 and a screw 100 can be arranged on the rear swing plate 10 to have the same function.

The technical means of adjustment of the timing belt 63 using the flange idler 64 is as follows. A screw 101 penetrates a fixing block 87 and then contacts the slide block 86, and then the slide block 86 can be moved back and forth by screwing the screw 101. The flange idler 64 fixed at the bottom of the slide block 86 is also moved back or forth, and that will regulate the tension of the timing belt 63. Screws 104 and 105 pin through slots 102 and 103 of the slide block 86 to fix the flange idler 64 underneath.

FIG. 5 shows a front view schematically showing the detailed structure of a photo arm system according to one embodiment of the present invention. Two ends of the slide screw 61 of the slide screw-nut assembly are respectively fixed on two ball bearing units 89 and 88, which are respectively fixed on the top plate 24 and bottom plate 25. A stop bearing 92 is arranged on the bottom plate 25, the penetration place of the slide screw 61 to prevent the sliding plate assembly from over descending. The slide screw 61 also penetrates and locks on the bottom sliding plate 74 via a nut 91. The installation of the slide screw 59 is similar to the above and no redundant description here.

Four linear bushings 65, 67, 69 and 71 are respectively arranged on four corners of the top sliding plate 73, and four linear bushings 75, 76, 77 and 78 on four corners of the bottom sliding plate 74. The ball splines 66, 68, 70 and 72 respectively pass through the linear bushings 65, 67, 69, 71, 75, 76, 77 and 78 and their two ends are clamped by shaft holders 84, 82, 85, and 83. The ball splines 66 and 70 are with the same way to be fixed and without repeating here. This kind design is helpful to have a stable and synchronous movement of the top and bottom sliding plates 73 and 74. When the timing belt 63 rotating the slide screws 61 and 59, the slide screws 61 and 59 can stably drive the top and bottom sliding plates 73 and 74 up and down.

The front view clearly shows the method of regulating the tension of the timing belt 63 by the flange idler 64. The flange idler 64 is fixed under the slide block 86, and the screw 101 penetrates the fixing block 87 and then connects to the slide block 86. When the screw 101 is driven in to push the slide block 86, the flange idler 64 moves forward to tighten the timing belt 63. When the screw 101 is driven out to pull the slide block 86, the flange idler 64 moves backward to loose the timing belt 63.

In one embodiment, the photo arm system adopts a single slide screw 59, a single nut 91, and a single timing pulley 60 to drive the top sliding plate 73 and bottom sliding plate 74 of the sliding plate assembly up and down. In this embodiment, the slide screw 61, the timing pulley 62, the timing belt 63, and the flange idler 64 are omitted, and even more all the linear bushings and ball splines may also be omitted. Alternatively, only a pair of linear bushings and a pair of ball splines are arranged on two corners diagonally.

Figure 6:
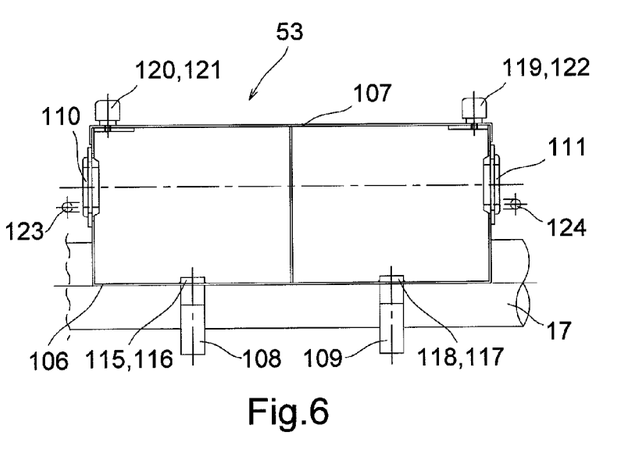
FIG. 6 is a front view of a power and signal connecting box of a photo arm system according to one embodiment of the present invention.
Figure 7:
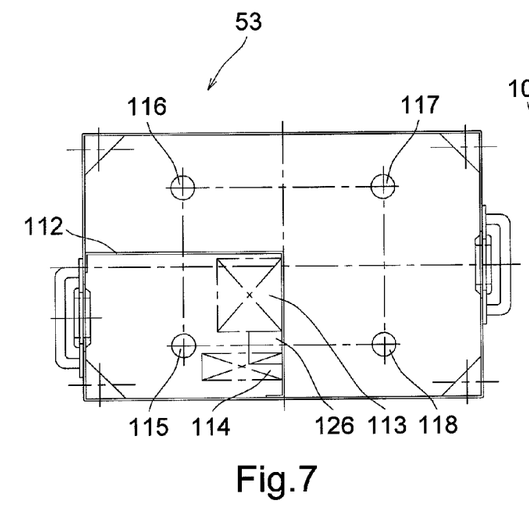
FIG. 7 is a top view of a power and signal connecting box of a photo arm system according to one embodiment of the present invention.
Figure 8:
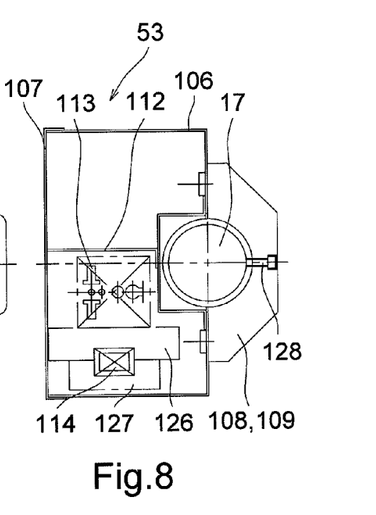
FIG. 8 is a side view of a power and signal connecting box of a photo arm system according to one embodiment of the present invention.

FIGS. 6, 7 and 8 respectively show a front view, a top view and a side view of a power and signal connecting box 53 according to one embodiment of the present invention. The power and signal connecting box 53 may be installed on the horizontal arm, the left vertical arm, the right vertical arm, or the camera fixing compartment. In this embodiment, the power and signal connecting box 53 is installed on the horizontal arm 17. However, this embodiment is not used to limit the present invention but only as an example.

Refer to FIG. 6. The power and signal connecting box 53 is installed to the horizontal arm 17 with fixing plates 108 and 109, and fixing screws 115, 116, 117 and 118 on the bottom of a box body 106. A top cover 107 of the power and signal connecting box 53 is fixed to the box body 106 with cap screws 119, 120, 121, and 122. Beside a cable entrance 110 and a cable exit 111 of the power and signal connecting box 53, pulls 123 and 124 are arranged for fixing power cords and signal cables, but it is noted the number of cable entrance 100/exit 111 can be plural or singular.

Refer to FIG. 7. An isolating plate 112 is arranged in the interior of the power and signal connecting box 53, and at least one universal power socket 113 and at least one USB port 114 are arranged on the isolating plate 112 for respectively providing power to the camera 48 and transmitting USB signals, including image signals and control instructions, and fixing block 126 is for securing the USB ports 114.

Refer to FIG. 8. Fixing blocks 126 and 127 respectively secure the USB port 114 and the universal power socket 113 to the power and signal connecting box 53. Fixing screws 128 penetrate the fixing plates 108 and 109 and fixed to the bottom of the horizontal arm 17 avoid sliding and rotating.

No power and signal connecting box is equipped on the photo arm of the conventional system to get no power socket for the camera nearby, so the power and signal cables has to be extended from outside power outlet and computer to the camera directly, and that is very inconveniencing operation and degrades esthetics. In the present invention, the power and signal connecting box 53 is installed on the vertical arm, the horizontal arm or the camera fixing compartment to dramatically decrease the needs of the camera power adapter cord and USB cable length, and it is convenient and esthetics.

In one aspect, the horizontal arm of the photo arm system may have a single branch or a plurality of branches. Each branch has a camera fixing compartment for fixing the cameras. The other end of the horizontal arm is fixed on the vertical arm. When the rotating vertical arm drives the horizontal arm to swing along a circular path, and the cameras can shoot from different angles simultaneously.

Figure 9:
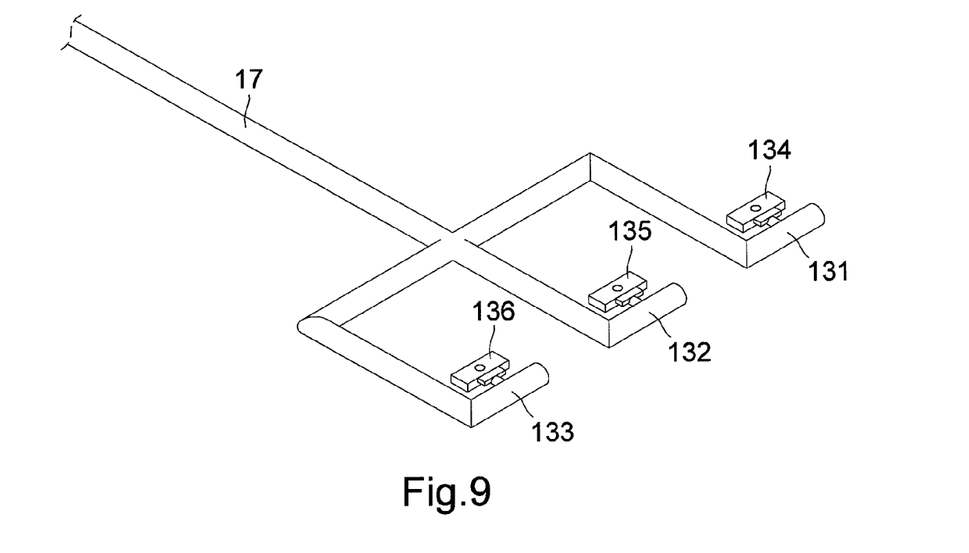
FIG. 9 is a diagram schematically showing that a plurality of cameras are respectively installed on a plurality of camera fixing compartments of a horizontal arm according to one embodiment of the present invention.

FIG. 9 shows a diagram schematically showing that cameras 134, 135 and 136 are respectively installed on camera fixing compartments 131, 132 and 133 of the horizontal arm 17 according to one embodiment of the present invention. In the present invention, a plurality of branches may be horizontally or vertically arranged on the end of the horizontal arm 17. In this embodiment, three branches are arranged in horizon, and each has a camera fixing compartment for mounting the cameras, such as 131, 132 and 133 in FIG. 9. Thus, several sets of photo devices can perform shooting simultaneously. It is emphatically noted that the number of branches is not limited.

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A photo arm system comprising
a vertical arm;
a horizontal arm, wherein one end of said horizontal arm has a plurality of branches, and wherein another end of said horizontal arm is coupled to said vertical arm;
a slide block, slidable vertically along said vertical arm, wherein said horizontal arm is coupled to said vertical arm via said slide block; and
a plurality of camera fixing compartments respectively installed on said branches, wherein said vertical arm is rotatable and used to implement multi-angle shootings.

2. The photo arm system according to claim 1 further comprising a fixing block fixedly installed on said vertical arm, wherein said horizontal arm is coupled to said vertical arm via said fixing block.

3. A photo arm system comprising
a vertical arm;

a horizontal arm, wherein one end of said horizontal arm has at least one branch, and wherein the other end of said horizontal arm is coupled to said vertical arm; and a box installed on said horizontal arm, said vertical arm or said camera fixing compartment and having at least one power socket and a top cover, wherein said top cover is detachable.

4. The photo arm system according to claim 3, wherein said box further has at least one USB port used to transmit image signals and control instructions.

5. A photo arm system comprising at least one vertical arm;

at least one horizontal arm, wherein one end of said horizontal arm has at least one branch, and wherein the other end of said horizontal arm is coupled to one side of said vertical arm, and wherein said branch has a camera fixing compartment;

a driving shaft fixedly installed on the other side of said vertical arm;

a worm-worm gear assembly coupled to said driving shaft; and a handwheel coupled to said worm-worm gear assembly and used to drive said worm-worm gear assembly, wherein said worm-worm gear assembly further drives said driving shaft to swing said vertical arm and said horizontal arm.

6. The photo arm system according to claim 5 further comprising a slide block slidable vertically along said vertical arm, wherein said horizontal arm is coupled to said vertical arm via said slide block for adjusting a shooting radius.

7. The photo arm system according to claim 5 further comprising a fixing block, wherein said horizontal arm is coupled to said vertical arm via said fixing block.

8. The photo arm system according to claim 5 further comprising a swing plate coupled to said driving shaft, wherein said vertical arm is fixed on said swing plate by one or a plurality of arm clamps.

9. The photo arm system according to claim 8, wherein said swing plate includes a front swing plate, a rear swing plate and a connecting rod, wherein said connecting rod connects said front swing plate and said rear swing plate.

10. The photo arm system according to claim 9 further comprising a scale arranged on said rear swing plate.

11. The photo arm system according to claim 5, wherein said camera fixing compartment includes a fixing plate;

a camera fixing unit fixed on said fixing plate via an adapter; and a plurality of collars fixing said fixing plate on said horizontal arm and implementing rotation of said camera fixing compartment.

12. The photo arm system according to claim 11 further comprising a holding tray fixed to a bottom of said fixing plate by a plurality of support ribs to prevent a camera from falling down.

13. A photo arm system comprising a vertical arm;

a horizontal arm, wherein one end of said horizontal arm has at least one branch, and wherein each said branch has a camera fixing compartment;

a driving shaft fixedly installed on one side of said vertical arm and driving said vertical arm and said horizontal arm to swing;

a sliding plate assembly, carrying said driving shaft and including a top sliding plate and a bottom sliding plate, wherein said driving shaft is ranged between said top sliding plate and said bottom sliding plate;

a slide screw-nut assembly penetrating said sliding plate assembly and driving said vertical arm, said horizontal arm and said camera fixing compartment to up and down; and a hoist handwheel or a motor rotating said slide screw-nut assembly to drive said sliding plate assembly to up and down.

14. The photo arm system according to claim 13, wherein said slide screw-nut assembly includes a front slide screw-nut assembly and a rear slide screw-nut assembly, and wherein one end of said slide screw of said front slide screw-nut assembly and one end of said slide screw of said rear slide screw-nut assembly are respectively engaged with two timing pulleys, and wherein said timing pulleys and said slide screws are driven by a timing belt to rotate synchronously to further drive said sliding plate assembly, said vertical arm, said horizontal arm and said camera fixing compartment to up and down.

15. The photo arm system according to claim 13 further comprising a plurality of linear bushing and ball spline assemblies, wherein said linear bushing and ball spline assemblies penetrate said sliding plate assembly to make said sliding plate assembly, said vertical arm, said horizontal arm and said camera fixing compartment up or down stably.

* * * * *